United States Patent [19]

Conboy

[11] Patent Number: 5,418,027
[45] Date of Patent: May 23, 1995

[54] WALL BOARD TAPE HAVING FIBROUS SURFACE

[76] Inventor: John S. Conboy, 2235 Devonsbrook Dr., Chesterfield, Mo. 63005

[21] Appl. No.: 205,202

[22] Filed: Mar. 3, 1994

[51] Int. Cl.⁶ ............................ B32B 3/10; B32B 5/02
[52] U.S. Cl. .................................. 428/43; 428/90; 428/134; 428/182; 428/195; 52/417
[58] Field of Search ............... 428/43, 90, 182, 195, 428/134; 156/71; 52/417

[56] References Cited

U.S. PATENT DOCUMENTS

| | | | |
|---|---|---|---|
| T887,014 | 6/1971 | Overbay et al. | 161/118 |
| 2,181,530 | 11/1939 | Davenport | 72/16 |
| 2,314,523 | 3/1943 | Speer | 72/16 |
| 2,862,264 | 12/1958 | Perna | 20/74 |
| 4,313,991 | 2/1982 | Lamb | 428/131 |
| 4,722,153 | 2/1988 | Hardy | 52/255 |
| 4,835,925 | 6/1989 | Hoffmann, Sr. | 52/288 |
| 4,863,774 | 9/1989 | Tucker | 428/77 |
| 5,037,686 | 8/1991 | Conboy | 428/43 |

FOREIGN PATENT DOCUMENTS

18015/29  1/1929  Australia ................ 52/417

Primary Examiner—Alexander S. Thomas
Attorney, Agent, or Firm—Polster, Lieder, Woodruff & Lucchesi

[57] ABSTRACT

A plastic wall board tape having a raised center section and outwardly extending wing areas which have a coating of fibers adhered to both sides. The raised center of the tape is weakened at the top to cause the tape to crease in a straight line when it is folded at an inside or outside corner to define a straight edge at the corner joint. The combination of the rigid water impervious tape and the fibers allows the tape to be applied over imperfectly fitted wall board joints with large imperfections because the fibers will achieve a mechanical bond with the wall board compound or other joint materials, allowing a slow cure, and the tape will not be softened by the compound. When used on an inside corner, the tape can be finished merely by striking the outer edge with compound as the top surface is a finish surface and requires paint only. The tape can have triangular cutouts in the wings and removable end strips to facilitate taping of curved corner joints.

16 Claims, 3 Drawing Sheets

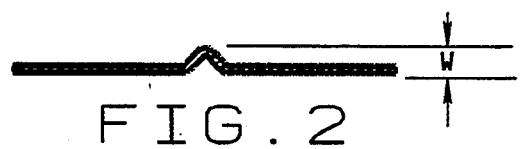
FIG. 2
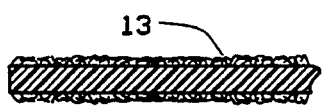
FIG. 3
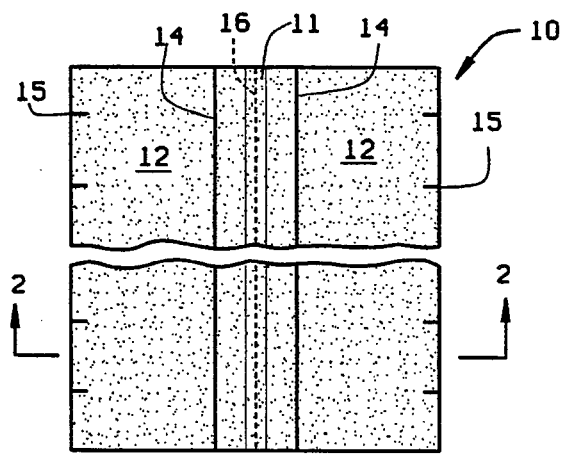
FIG. 1
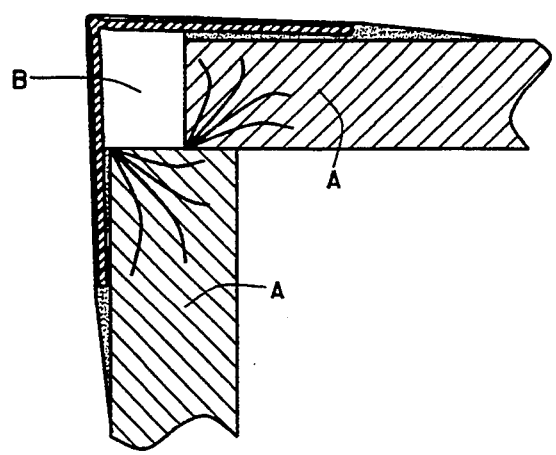
FIG. 4A
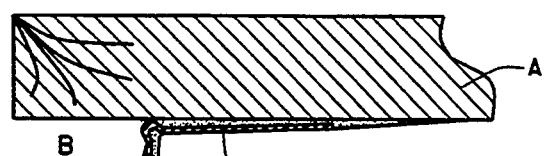
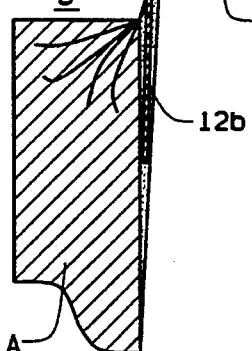
FIG. 4
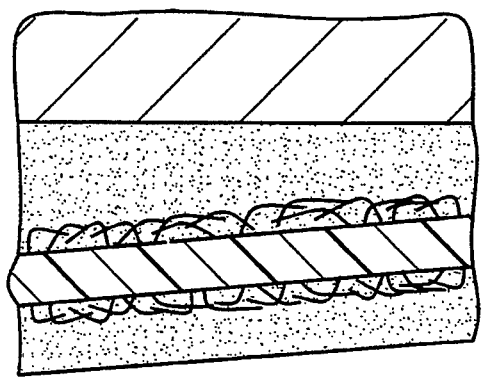
FIG. 5

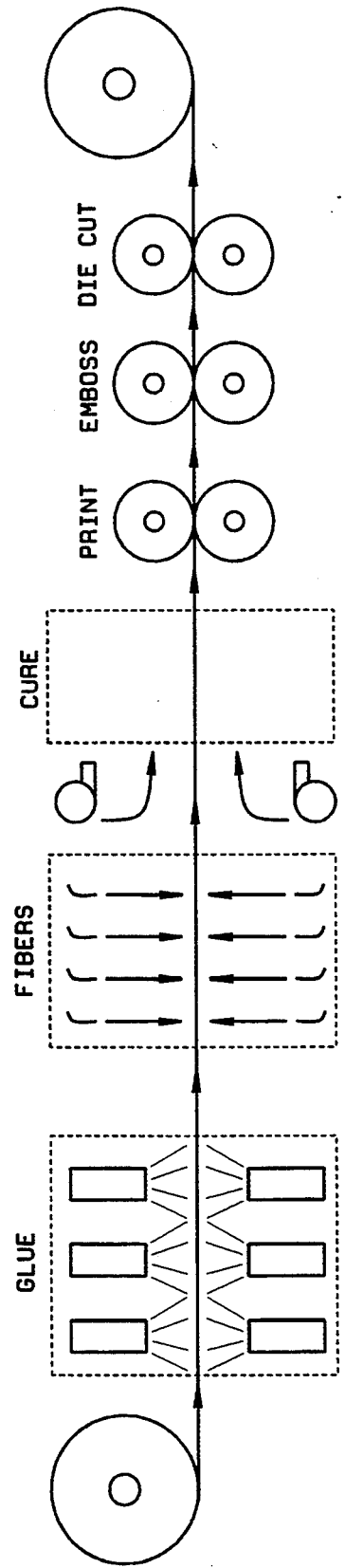
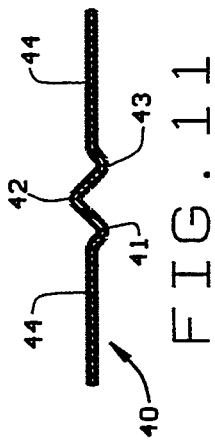
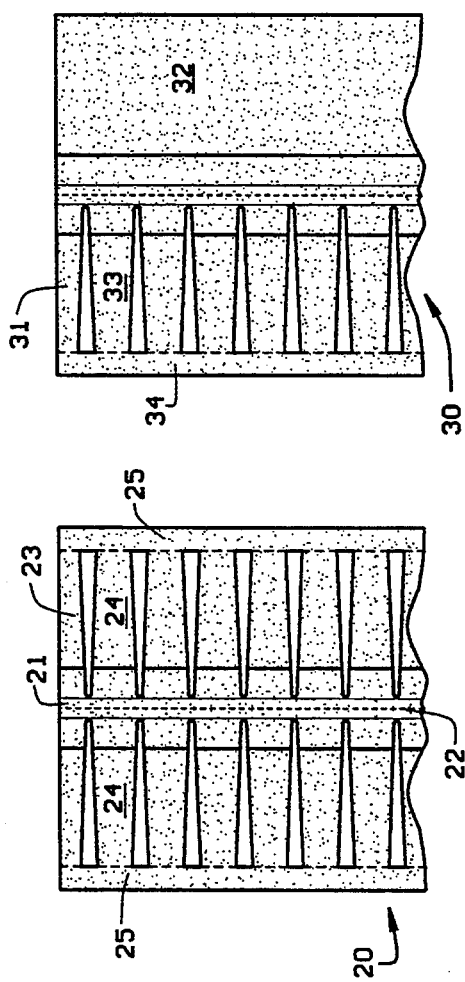

WALL BOARD TAPE HAVING FIBROUS SURFACE

BACKGROUND OF THE INVENTION

This invention relates to wall board tapes, including dry wall tapes, and particularly relates to a novel wall board plastic tape having fibrous surface to which wall board compound can readily be adhered in substantial thickness in a single coat without fear of the compound cracking or spalling. The tape is specifically applicable to corner joints as well as flat joints and, in one form, is usable on curved joints, such as curved or arched openings, and on the inside or outside tangent corner of a two barrel ceiling. The tape has a fibrous surface coating on both top and bottom sides which attaches to the drywall or wall board setting compound and adheres the tape to the underlying wallboard surface.

Present plastic and paper wall board tapes have certain drawbacks. Water based dry wall or wall board setting compound is difficult to adhere permanently to plastic tapes because plastic products have a smooth surface and some plastics can leak out plasticizers over time which tends to break down the bond between the compound and the tape. To create a mechanical bond, the tape must be roughened or perforations made in the tape to help the adherence problem. As the compound is curing, it sags or oozes from the perforations and drys as a protrusion on the surface. These protrusions make the application of a very thin second coat extremely difficult. These procedures also are costly and/or time consuming.

A difficulty with paper tape is that it tends to absorb water and soften when applied over thick amounts of compound as is necessary when taping irregular joints and corners. When the paper softens it sages and deforms, and a straight line corner is not achieved. Thus, paper must be applied over thin layers of compound which requires a number of coats of compound or the imperfections must be pre-filled, increasing labor costs and time of finishing.

A principal object of the present invention is to provide a plastic tape which can be adhered by water based #1 taping compound in a one coat application to an inside corner or over a two coat application when applied to an outside corner to provide a permanent straight corner. This is achieved without using any mechanical fasteners. When taping an inside corner, dry wall compound is applied to the wallboard surfaces at the corner, the tape is applied and wiped smooth with a taping knife to embed the tape into the compound and remove excess compound, and a finish coat of compound is applied over both wings of the tape and struck off in a finish coat. The fibers on the tape act to center the tape and act as shims to keep tape parallel with the wall surface when the taper bears down on the tape while wiping the tape clean.

Another object is to provide a plastic tape having an embossed raised center portion witch a straight edge to facilitate creasing in a straight line so as to define a straight corner when applied to a corner joint. Still another object is to provide a plastic tape with a raised center and depending wings which are coated on both surfaces with fibers to enhance adherence of water based dry wall compound to the tape. Another object is to provide a flat joint tape with fibers on the surfaces. A further object is to provide a method of making such tapes.

These and other objects and advantages will become apparent hereinafter.

SUMMARY OF THE INVENTION

The present invention comprises a plastic wall board tape having a center section bendable in a straight line with depending wings coated on both surfaces with fibers to create a mechanical bond with water based taping compound.

The invention also consists in the parts and in the arrangements and combinations of parts hereinafter described and claimed.

DESCRIPTION OF THE DRAWINGS

In the accompanying drawings which form part of the specification and wherein like numbers and letters refer to like parts wherever they occur.

FIG. 1 is a fragmentary plan view of a section of tape showing the invention;

FIG. 2 is a sectional view taken along line 2—2 of FIG. 1;

FIG. 3 is an enlarged fragmentary sectional view of a part of the tape;

FIG. 4 is a fragmentary sectional view of an inside joint showing one wing of the tape covered with a finish coat of taping compound and the other wing merely skim coated on the outer edge;

FIG. 4A is a fragmentary sectional view of an outside joint showing both tape wings with finish coats of taping compound;

FIG. 5 is an enlarged fragmentary sectional view of the installation of FIGS. 4 and 4A wherein the tape wing is finish coated and showing the engagement of fibers and taping compound;

FIG. 9 is a fragmentary view of a modified form of tape;

FIG. 10 is a fragmentary plan view of a further modification of the tape of this invention;

FIG. 11 is a sectional view of a further modification of the tape of this invention;

FIG. 12 is a sectional view of a further modification of the tape of this invention;

FIG. 14 is a schematic flow diagram of a process for making this invention.

DETAILED DESCRIPTION

Figure 6:
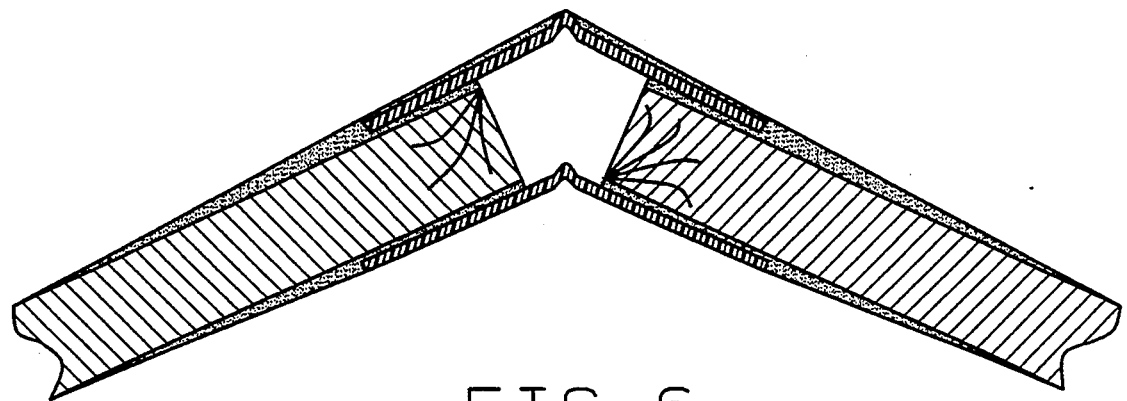
FIG. 6 is an enlarged fragmentary sectional view of a joint showing inside and outside corners.
Figure 7:
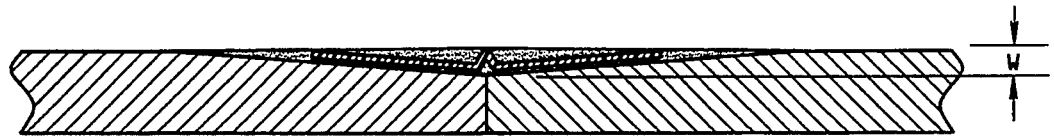
FIG. 7 is a fragmentary sectional view of a flat joint showing the tape and taping compound applied thereto.

The preferred form of the present invention is embodied in FIGS. 1-3 and comprises a dry wall tape 10 which normally is sold in 50-100 foot rolls. The tape 10 is made of plastic, preferably polyvinyl chloride (PVC) and includes a raised center segment 11 and outwardly depending side segments 12.

Adhered to the top and bottom of the center segment 11 and the side segments 12 are a plurality of discrete fibers 13 (see FIG. 3). The fibers 13 are known as floc and can be Nylon, rayon, Dacron, polyester, cotton or other cellulose, or other similar fibers or combinations of fibers. The preferred fibers are cotton and nylon and combinations of nylon and cotton. Nylon fibers or other water impervious fibers are used where a waterproof application is required. This would typically be a bathroom shower stall or tub installation or an exterior application. Typical of such are DURA/ROCK concrete board, or DRYIT exterior system, etc. The fibers 13 have a diameter of about 1-3 Tow deniers, but larger or smaller sizes will work. The preferred lengths of fibers 13 are about 0.005 to about 0.030 inches. Longer or shorter fibers will work, however. Those parameters are preferred because when the coated tape is applied to a wall joint and only the tape edge is skim coated, the uncoated surfaces can be painted as a finished wall. The preferred size fibers are small enough to lay down when painted so the paint will create a smooth finished surface. Larger sized fibers do not give the desired smooth, painted surface. When the fibers 13 are cotton, the product is less costly and the water absorption characteristics which help the fibers bond to the water base dry wall compound are better.

FIG. 14 shows schematically a process for making tape. The coated tape is produced by passing flat plastic tape first through a glue applicator, where a suitable adhesive is rolled or sprayed over the top and bottom surfaces. The tape then is passed to a chamber where a predetermined amount of the fibers are applied. The glue cures and dries and permanently adheres the fibers to the tape and the excess fibers are then blown and mechanically brushed from the tape. The flat roll of tape is then passed through a printing die where desired indicia are applied. The next step is to emboss the center sections on the tape. Finally, the tape is passed through cutting dies where cut-outs in the wings are made, if desired. Application of the fibers creates completely coated upper and lower surfaces with numerous voids. Thus, when taping compound is applied to the tape, it is mechanically entrapped in the numerous voids and also attaches to the outer surfaces of the fibers, thus enhancing the effective surface area of the tape and creating a powerful bond between the tape and the wallboard.

The amount of fibers on the tape is controlled by the amount of glue or bonding agent which is applied to the tape as well as by the time the tape is in the application chamber. The number of fibers also depends on the absorbency of the fibers and the cost of the fibers. Only enough fibers are required to adhere the taping compound to the tape and the wallboard to eliminate cracking and spalling of the taping compound on drying.

The coating is uniform in appearance and to the naked eye appears to be a smooth surface. In fact, it can be painted over without skim coating with taping compound.

In applying the tape 10 to an inside corner (as shown in FIG. 4), the taping compound is applied to the wallboard A, the tape 10 is applied, wiped smooth with a taping knife, and cured. The second (and final) coat requires only striking off the compound to the outer edges of the tape 10 as shown in wing 12a. The tape edge produces a straight edge for the installer. The top surface of the tape can be directly painted over without the installer applying any compound to it. Of course, compound can be applied to the tape surface if desired as shown in wing 12b. FIG. 4 shows the tape 10 used to bridge an opening B between poorly fitted wallboard sections A. The rigidity of the plastic tape 10 allows this.

FIG. 4A shows the tape 10 applied to an outside corner where the wallboard sections A do not fit snuggly, also resulting in a void B. The tape 10 can be used to bridge the opening between the poorly fitted wallboard. The tape 10, being plastic has sufficient rigidity to frame the opening B between the wallboard segments without the opening being filled with taping compound. Because the taping compound bonds strongly to the fibers 13 on the tape 10, the tape 10 becomes extremely strong and permanently bonded to the wallboard.

Lines 14 printed on the top surface of the tape segments 12 help the assembler line up the tape on its initial application. By looking down the joint along the lines 14, the applicator can tell if the tape 10 is on straight.

The tape 10 has length indicia 15 printed on the edges at regular intervals (6" or 12") to make installations of desired lengths very quick and easy.

The tape 10 preferably has a longitudinal rolled or embossed line of weakness 16 along the top of the center segment 11 to facilitate bending or folding the tape 10 at all angles without distortion. However, with a V-shaped center segment 11, the tape 10 tends to be foldable along the apex of the "V" without a definite weakening line. The high speed embossing of the "V" fatigues the plastic at the apex of the "V".

To facilitate using the tape on curved or arched edges, FIG. 9 shows a modified tape 20 which includes a raised center segment 21 preferably having a line of weakness 22 down the center thereof. The depending side segments 23 comprise spaced elements 24 which may be aligned as shown or may be offset and staggered from one side to the other. The elements 24 preferably are somewhat V-shaped with the large ends of the V-shaped elements 24 being connected to the center segment 21 and the small ends of the segments 23 being connected together by a removable tear strip 25. The tear strips 25 hold the elements 24 together before installation, but are removed when a curved corner is taped to allow the elements 24 to move apart or closer together as the tape is applied around a corner. The elements 23 can be rectangular or other suitable shape which allows the elements 23 to move together or apart as the tape 20 is bent during application.

Figure 13:
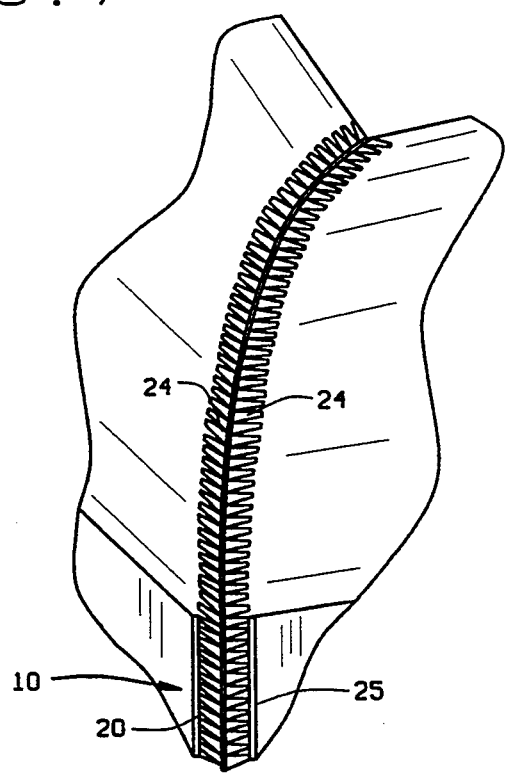
FIG. 13 is a fragmentary perspective view of the tape of FIG. 9 applied to a barrel ceiling.

Use of the tape 20 is shown in FIG. 13 as applied to a barrel ceiling. Only the part of the tear strips 25 are removed where the tape 20 is applied to a curved surface. The tear strips 25 remain on the straight edges to rigidify the tape and provide a straight edge for finishing.

Figure 8:
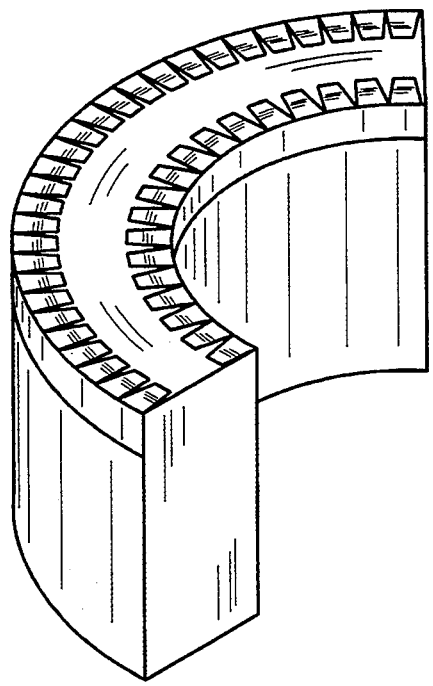
FIG. 8 is a perspective view showing the modified tape of FIG. 10 applied to a curved corner.

FIG. 10 shows a further modification of the tape 30 for applying along an arch wherein only one side 31 of the tape 30 has to expand or contract and the other side 32 lies smoothly on the tope of the wall arch segment. This is shown in FIG. 8. In this variation, the first taping wing 31 has spaced segments 33 contented by a removable strap 34. The second wing 32 is solid and constructed to lie smoothly on the flat side of an arch segment.

FIG. 11 shows another embodiment of the tape 40 which has three offset elements 41,42,43 in the center connecting the wings 44. Both surfaces of the tape 40 are coated with fibers 13. The tape 40 is similar to the tape shown in my U.S. Pat. No. 5,037,686 and has the same advantages. It also can be formed with the slots and connecting tabs shown in FIGS. 9-10.

FIG. 12 shows another variation of the invention embodied in a flat tape 50 which is coated with fibers on both sides. The tape 50 is suitable for flat joints and can have a centerline embossed therein for folding to make a straight edge for corners.

The tape 10,20,30,40,50 itself preferably is PVC although other semi-rigid polymeric materials are satisfactory.

The tape 10 is about 0.015–0.020 inches (preferably about 0.017 inches) in thickness to provide sufficient rigidity to bridge gaps in wallboard installation while having enough flexibility to be packaged in rolls without taking a set. It also is thin enough to minimize the weight of the tape and the amount of dry wall compound needed to apply it.

Thus, among the advantages that the tape of this invention has over known dry wall tapes are the following:

1) Being plastic the tape can be applied to situations where the wall board joint has deep imperfections and thick coatings of wall board compound may be required. The plastic substrate prolongs drying time of the compound and the compound does not shrink as it dries because it dries from the inside out due to the plastic tape retaining moisture and encapsulating the compound against the wallboard.
2) Because of the rigidity of the tape, large imperfections in wall applications can be overcome by filling the imperfections with compound, applying the tape, aligning the corners using the printed indicia, and allowing the compound to dry without the tape shrinking, bulging or moving. The initial bonding of the fibers holds large amounts of compound in place until cured.
3) Because the tape is not softened by large amounts of wet compound as would be the case with a paper tape, the first coat stays straight and uniform as it cures. This eliminates the need to pre-fill large imperfections in layers to make a smooth installation surface.
4) In inside corner applications, the tape is applied to a bed of compound, wiped down with a taping knife so that only the edges of the tape require a finish coat. The surface in an inside corner is a suitable finish surface, ready for painting or a textured surface. A finish compound coating can be applied, if desired. Thus, in an inside corner the installer only has to strike the outside edge of the tape, using the edge as a straight edge guide, to complete application. The top surface of the tape can be painted or skim coated with compound.
5) Since no finish coating of compound is required on inside corners, no cracks will ever form at the joint because cracks tend to form in time in taped joints because of settling, shrinkage, etc.
6) Since the tape has printed alignment and length indicia, installation of desired lengths is quick and easy and corners can be installed quickly and the tape can be lined up to define a straight corner or edge.
7) When the tape is used on an outside corner, the embossed center edge is used as a straight edge for striking off the compound in a straight line.
8) The angled sides and/or line of weakness caused by embossing the center segment of the tape allows it to be folded without bulging the sides and allows a quick straight fold.
9) Since the tape is plastic, it is waterproof and can be used on waterproof board in wet areas without rusting. Also, small cracks in the corners of tub and shower stalls will not leak when this tape is used.
10) The removable tear strip used with the raised center segment allows rapid installation on curved corner joints. If it is left on for straight areas, it gives rigidity to the tape and a straight continuous edge in these areas, with a smooth transitition to the curved areas where the tear strip is removed.
11) The taper can bear down on the tape without squeezing all of the compound out from beneath the tape because the fibers adhere the compound to the tape and act as a shim or spacer to hold some compound between tape and wallboard. On any corner, the tape centers itself on the corner and aligns the wings parallel with the wall surfaces to position the raised or center of the tape to coincide with the line defined by the intersection of the wall surfaces.
12) The taper can align the tape in a straight line by bearing down on each leg so the tape in effect is self-centering on the corner.
13) If necessary because of irregular sub-framing, the tape also can be aligned by hand using the prepositioned lines on the tape, because the taping compound sets more slowly with the plastic tape prolonging curing time.

The preferred plastic substrate is polyvinyl chloride, but other plastics can be used. A specifically preferred product is ARLINYL 940 by Arlington Mills, Inc. of Arlington Heights, Ill. The product has the following properties and other materials should have similar characteristics.

| GENERAL PURPOSE COPOLYMER POLYVINYL CHLORIDE (PVC) DESIGNATED "ARLINYL" 940 | |
|---|---|
| PROPERTY | VALUE |
| SPECIFIC GRAVITY | 1.38–1.42 |
| WATER ABSORPTION | .28 |
| TENSILE STRENGTH | 5000 PSI, PLUS |
| ELONGATION | 150%, PLUS |
| MODULUS OF ELASTICITY IN TENSION | 310,000–350,000 |
| FLEXURAL STRENGTH | 10,000–12,000 |
| MODULUS OF ELASTICITY IN FLEXURE | 380,000–420,000 |
| IZOD IMPACT STRENGTH | HIGH |
| FLAMMABILITY | SELF-EXT. |
| HEAT DISTORTION (264/LB./IN. FIBER STRESS | 62–64 |
| HARDNESS (SHORE D) | 72–78 |
| VICAT SOFTENING POINT | 84 (±3) |

Thus it is seen that the present invention achieves all of the objects and advantages sought therefor and this invention is intended to cover all changes and modifications of the example of the invention herein chosen for purposes of the disclosure which do not constitute departures from the spirit and scope of the invention.

What is claimed is:

1. A plastic wall board tape comprising
   a) a plastic flat tape body element having a top surface and bottom surface, and
   b) discrete fibers adhered to both sides of the tape body element to adhere wall board compound to the tape.
2. The tape of claim 1 wherein the fibers are about 1 to about 3 deniers in diameter and about 0.005 to about 0.030 inches in length.
3. The tape of claim 1 wherein the fibers are selected from the group consisting of Nylon, rayon, Dacron, polyester, cotton or other cellulose and mixtures of these fibers.

4. The dry wall tape of claim 1 wherein the center segment has an embossed line of weakness along its uppermost area.

5. The tape of claim 1 including regularly spaced indicia along its length to facilitate the user cutting it to desired lengths.

6. The tape of claim 1 including longitudinal indicia on its top surface to facilitate the user aligning the tape along a corner.

7. A plastic wall board tape having top and bottom surfaces and adapted to be used on both inside and outside corners comprising
  a) a raised center segment extending longitudinally of the tape,
  b) lateral side segments extending outwardly from the center segment, the top surfaces of the side segments being below the top surface of the center segment, and
  c) discrete fibers adhered to both sides of the tape to adhere dry wall compound to the plastic tape.

8. The tape of claim 1 wherein the fibers are about 1 to about 3 deniers in diameter and about 0.005 to about 0.030 inches in length.

9. The tape of claim 7 wherein the fibers are selected from the group consisting of Nylon, rayon, Dacron, polyester, cotton or other cellulose and mixtures of these fibers.

10. The wall board tape of claim 7 wherein the center segment has an embossed line of weakness along its uppermost area.

11. The wall board tape of claim 7 wherein at least one of the side segments is comprised of spaced elements extending from the center segment to their outermost longitudinal edges and removable tear strips along the longitudinal edges holding the spaced elements together and removable to permit taping a curved edge.

12. The tape of claim 11 wherein both side segments have spaced segments.

13. The tape of claim 11 wherein the segments are substantially V-shaped to facilitate use of the tape on the outside edges of arches and leaving as much tape surface area as possible to bond to wall surfaces.

14. The tape of claim 7 including regularly spaced indicia along its length to facilitate the user cutting it to desired lengths.

15. The tape of claim 7 including longitudinal indicia on its top surface to facilitate the user aligning the tape along a corner.

16. The tape of claim 7 including reversely curved segments between the center segment and the lateral side segments.

* * * * *